United States Patent
Zou

(10) Patent No.: US 7,991,428 B2
(45) Date of Patent: Aug. 2, 2011

(54) DUAL-MODE DUAL-STANDBY PORTABLE COMMUNICATION APPARATUS AND METHOD FOR ENABLING COMMUNICATION BY SENSING THEREOF

(75) Inventor: Zhengrong Zou, Nanjing (CN)

(73) Assignee: Inventec Appliances Corp., Taipei (TW)

( * ) Notice: Subject to any disclaimer, the term of this patent is extended or adjusted under 35 U.S.C. 154(b) by 722 days.

(21) Appl. No.: 12/024,922

(22) Filed: Feb. 1, 2008

(65) Prior Publication Data
US 2009/0131100 A1   May 21, 2009

(30) Foreign Application Priority Data
Nov. 16, 2007   (TW) ................................ 96143615 A

(51) Int. Cl.
*H04M 1/00* (2006.01)
(52) U.S. Cl. .................................. 455/552.1; 455/556.1
(58) Field of Classification Search ............... 455/550.1, 455/552.1, 572, 574, 556.1
See application file for complete search history.

(56) References Cited

U.S. PATENT DOCUMENTS
2005/0004496 A1*   1/2005   Pilu et al. ...................... 600/595
2008/0161050 A1*   7/2008   Shudark et al. ............... 455/558
* cited by examiner

*Primary Examiner* — Nhan Le
(74) *Attorney, Agent, or Firm* — Birch, Stewart, Kolasch & Birch, LLP

(57) ABSTRACT

A method for enabling communication by sensing of a dual-mode dual-standby (DMDS) portable communication apparatus. The DMDS portable communication apparatus includes a processing module, a first light-sensing module, a second light-sensing module, a first communication module and a second communication module. The first light-sensing module, the second light-sensing module, the first communication module and the second communication module are electrically connected with the processing module. The method includes the steps of: sensing by the first light-sensing module so as to transmit a first sensing signal to the processing module; sensing by the second light-sensing module so as to transmit a second sensing signal to the processing module; and correspondingly enabling the first communication module or the second communication module to enter a communication mode by the processing module according to the first sensing signal and/or the second sensing signal.

20 Claims, 4 Drawing Sheets

DUAL-MODE DUAL-STANDBY PORTABLE COMMUNICATION APPARATUS AND METHOD FOR ENABLING COMMUNICATION BY SENSING THEREOF

BACKGROUND OF THE INVENTION

1. Field of Invention

The invention relates to a portable communication apparatus and a method for enabling communication by sensing thereof. More particularly, the invention relates to a dual-mode dual-standby (DMDS) portable communication apparatus and a method for enabling communication by sensing thereof.

2. Related Art

With the development of technology, portable communication apparatuses have become indispensable electronic apparatuses. Recently, the dual-mode dual-standby (DMDS) portable communication apparatus allowing a user to log in two different communication systems, such as Global System for Mobile Communication (GSM) and Personal Handyphone System (PHS), or the same communication system with different frequency bands, such as GSM 900 and GSM 1800, using two SIMs (subscriber identity models) is presented to the public. Thus, the user can answer two calls coming from two sources momentarily.

The conventional DMDS portable communication apparatus can answer two calls with two communication systems by manual control. When the two communication systems simultaneously receive the calls, the user has to enter a functional menu to select to answer which call of the communication system. If another call has to be answered when the one call is being answered, the user has to enter the functional menu to make the other selection. According to this manner, the user has to operate the apparatus in a complicated manner, and the operation cannot be made in a rapid manner and a human-oriented manner.

Therefore, it is an important subject to provide a DMDS portable communication apparatus and a method for enabling communication by sensing thereof, wherein a user can use the DMDS portable communication apparatus to selectively answer calls and switching between the calls without any button.

SUMMARY OF THE INVENTION

In view of the foregoing, the invention is to provide a dual-mode dual-standby (DMDS) portable communication apparatus and a method for enabling communication by sensing thereof, wherein a user can use the DMDS portable communication apparatus to selectively answer calls and switching between the calls without any button.

To achieve the above, the invention discloses a method for enabling communication of a DMDS portable communication apparatus, which includes a processing module, a first light-sensing module, a second light-sensing module, a first communication module and a second communication module. The first light-sensing module, the second light-sensing module, the first communication module and the second communication module are electrically connected with the processing module. The method for enabling communication includes the steps of sensing by the first light-sensing module so as to transmit a first sensing signal to the processing module, sensing by the second light-sensing module so as to transmit a second sensing signal to the processing module, and correspondingly enabling the first communication module or the second communication module to enter a communication mode by the processing module according to the first sensing signal and/or the second sensing signal.

In addition, the invention also discloses a DMDS portable communication apparatus, which includes a processing module, a first communication module, a second communication module, a first light-sensing module and a second light-sensing module. The first communication module, the second communication module, the first light-sensing module and the second light-sensing module are electrically connected with the processing module. The first light-sensing module senses and then transmits a first sensing signal to the processing module. The second light-sensing module senses and then transmits a second sensing signal to the processing module. The processing module correspondingly enables the first communication module or the second communication module to enter a communication mode according to the first sensing signal and/or the second sensing signal.

As mentioned above, the DMDS portable communication apparatus and the method for enabling communication by sensing thereof according to the invention have the following features. Two light-sensing modules are provided to sense and then transmit the sensing signals to the processing module. The processing module correspondingly enables the first communication module or the second communication module to enter the communication mode according to the sensing signals so that the user can answer the call. Compared with the prior art, the invention can selectively answer the calls and switch between the calls without any button, and the efficiency in use may be enhanced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
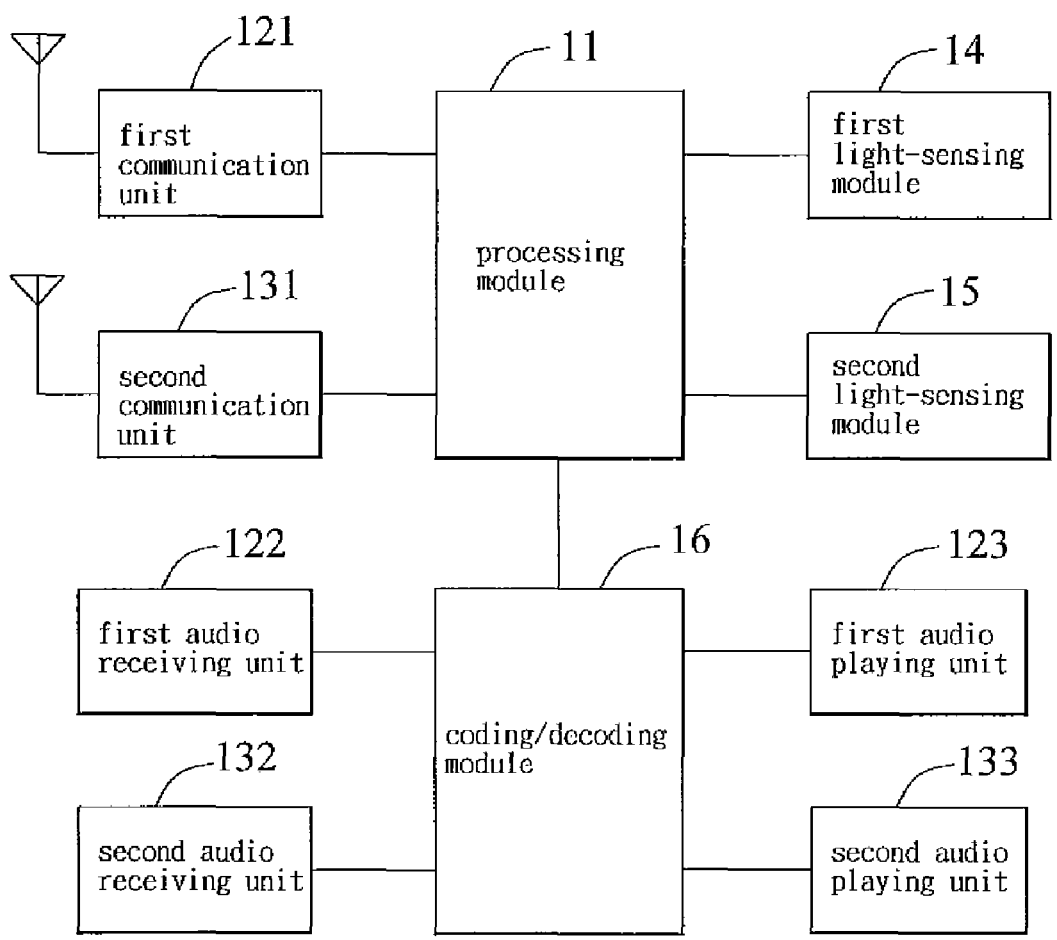
FIG. 1 is a block diagram showing a DMDS portable communication apparatus according to a preferred embodiment of the invention.

Referring to FIG. 1, a DMDS portable communication apparatus 1 according to the preferred embodiment of the invention includes a processing module 11, a first communication module 12, a second communication module 13, a first light-sensing module 14 and a second light-sensing module 15. The processing module 11, which may be implemented by hardware or by hardware and software, includes a central processing unit (CPU) and/or a micro controller unit (MCU).

The first communication module 12 and the second communication module 13 are electrically connected with the processing module 11. Each of the first communication module 12 and the second communication module 13 has an antenna for transmitting and receiving electromagnetic wave signals to enable communication of the DMDS portable communication apparatus 1 and simultaneously receiving a call. The first communication module 12 has a first communication unit 121, a first audio receiving unit 122 and a first audio playing unit 123. The first audio receiving unit 122 and the first audio playing unit 123 are electrically connected with the first communication unit 121. The second communication module 13 has a second communication unit 131, a second audio receiving unit 132 and a second audio playing unit 133. The second audio receiving unit 132 and the second audio playing unit 133 are electrically connected with the second communication unit 131. Each of the first audio receiving unit 122 and the second audio receiving unit 132 includes, for example but not limited to, a microphone. Each of the first audio playing unit 123 and the second audio playing unit 133 includes, for example but not limited to, an earphone or a speaker. The first audio receiving unit 122, the second audio receiving unit 132, the first audio playing unit 123 and the second audio playing unit 133 are electrically connected with a coding/decoding module 16 for coding and decoding a signal. The coding/decoding module 16 includes, for example but not limited to, an audio encoder-decoder (Codec).

The first communication module 12 and the second communication module 13 may pertain to different communication systems, each of which may be selected from the group consisting of Global System for Mobile Communication (GSM), Personal Handy-phone System (PHS), Code Division Multiple Access (CDMA), Time Division Synchronized Code Division Multiple Access (TD-SCDMA), Wide-Band Code Division Multiple Access (WCDMA) and CDMA 2000. The first communication module 12 and the second communication module 13 may also pertain to the same communication system with different frequency bands. For example, each of the GSM and CDMA has two or more than two communication frequency bands. In addition, the first communication module 12 and the second communication module 13 in the DMDS portable communication apparatus 1 may be respectively a main communication module and a sub-communication module, or vice versa.

The first light-sensing module 14 and the second light-sensing module 15 are electrically connected with the processing module and can sense and then transmit a first sensing signal and a second sensing signal to the processing module 11. The processing module 11 correspondingly enables the first communication module 12 or the second communication module 13 to enter a communication mode according to the first sensing signal and/or the second sensing signal.

Figure 2:
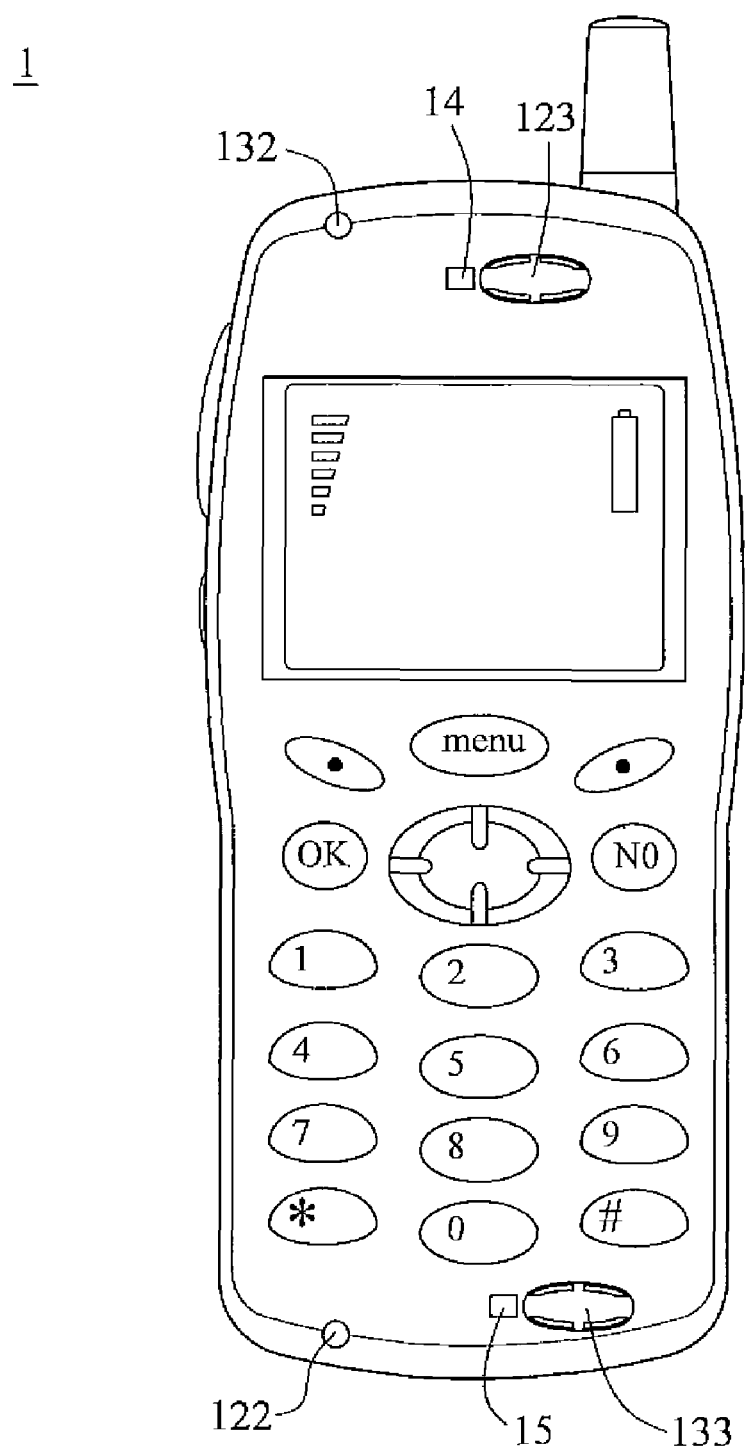
FIG. 2 is a schematic illustration showing the DMDS portable communication apparatus according to the preferred embodiment of the invention.

The positions of the first audio receiving unit 122, the first audio playing unit 123, the second audio receiving unit 132, the second audio playing unit 133, the first light-sensing module 14 and the second light-sensing module 15 may be shown in FIG. 2. The first light-sensing module 14 may be disposed adjacent to the first audio playing unit 123 or the first audio receiving unit 122. Herein, the first light-sensing module 14 is disposed adjacent to the first audio playing unit 123 without any limitative purpose. The second light-sensing module 15 may be disposed adjacent to the second audio playing unit 133 or the second audio receiving unit 132 and is disposed adjacent to the second audio playing unit 133 in this example. In addition, the first audio receiving unit 122 is disposed adjacent to the second audio playing unit 133, and the second audio receiving unit 132 is disposed adjacent to the first audio playing unit 123.

Figure 3:
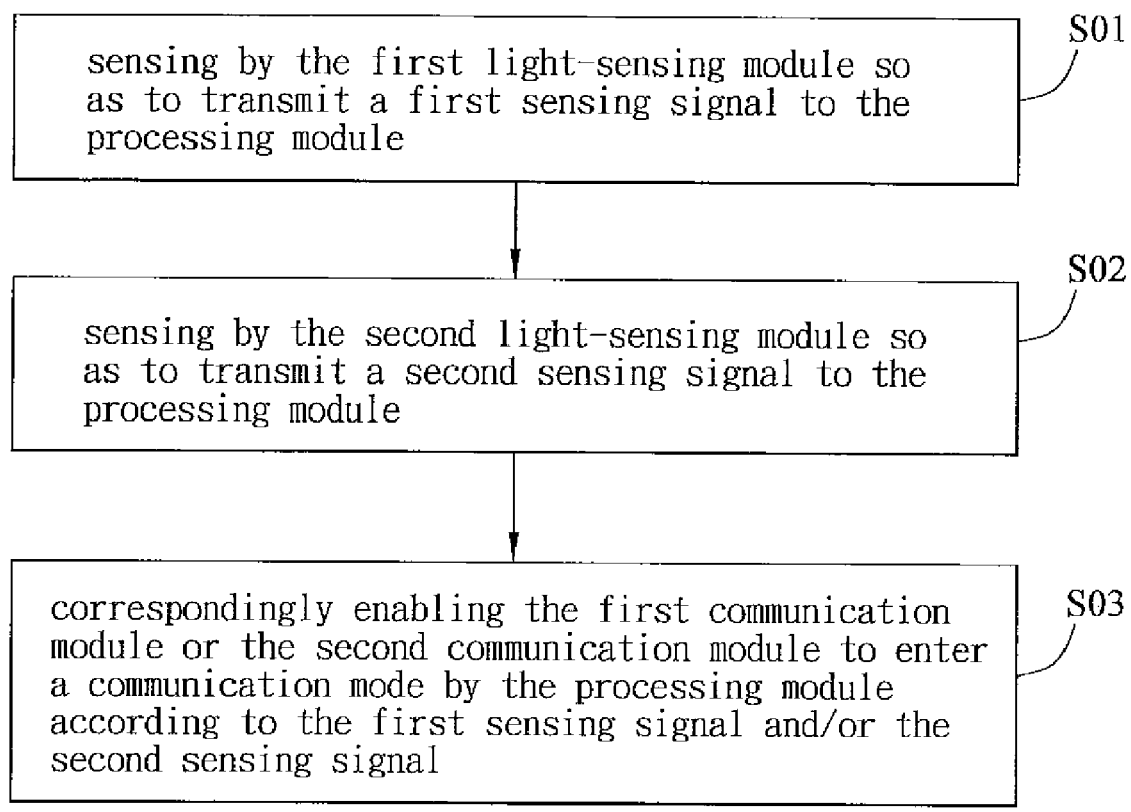
FIG. 3 is a flow chart showing a method for enabling communication by sensing of the DMDS portable communication apparatus according to the preferred embodiment of the invention.

Referring to FIG. 3, the method for enabling the communication by sensing of the DMDS portable communication apparatus 1 according to the preferred embodiment of the invention mainly includes steps S01 to S03. The method for enabling the communication by sensing of the DMDS portable communication apparatus 1 will be described in detail with reference to FIGS. 1 to 3.

In the step S01, the first light-sensing module 14 senses and then transmits the first sensing signal to the processing module 11. When the DMDS portable communication apparatus 1 receives a calling signal, the first light-sensing module 14 can sense and then transmit the first sensing signal to the processing module 11.

In the step S02, the second light-sensing module 15 senses and then transmits the second sensing signal to the processing module 11. When the DMDS portable communication apparatus 1 receives the calling signal, the second light-sensing module 15 can sense and then transmit the second sensing signal to the processing module 11.

In the step S03, the processing module 11 correspondingly enables the first communication module 12 or the second communication module 13 to enter the communication mode according to the first sensing signal and/or the second sensing signal.

In this embodiment, the first sensing signal and the second sensing signal may be transmitted in various manners. In the first manner, when the first communication unit 121 and/or the second communication unit 131 receive/receives a call, the first light-sensing module 14 and the second light-sensing module 15 perform sensing operations and respectively transmit the first sensing signal and the second sensing signal to the processing module 11. When the user places the first audio playing unit 123 or the second audio playing unit 133 near the ear as the call comes, the first light-sensing module 14 or the second light-sensing module 15 senses the lower light intensity relative to that sensed in the normal condition, and transmits the first sensing signal or the second sensing signal to the processing module 11. The processing module 11 correspondingly enables the first communication module 12 or the second communication module 13 to enter the communication mode according to the first sensing signal and the second sensing signal.

In the second manner, when the communication unit receives the call, only one light-sensing module senses and then transmits the sensing signal to the processing module 11. For example, when the first communication unit 121 receives the call, only the first light-sensing module 14 senses and then transmits the first sensing signal to the processing module 11. When the user places the first audio playing unit 123 near the ear as the call comes, the first light-sensing module 14 senses the lower light intensity relative to that sensed in the normal condition, and transmits the first sensing signal to the processing module 11. The processing module 11 correspondingly enables the first communication module 12 to enter the communication mode according to the first sensing signal.

In addition, when the second communication unit 131 receives the call, only the second light-sensing module 15 senses and then transmits the second sensing signal to the processing module 11. When the user places the second audio playing unit 133 near the ear as the call comes, the second light-sensing module 15 senses the lower light intensity relative to that sensed in the normal condition, and transmits the second sensing signal to the processing module 11. The processing module 11 correspondingly enables the second communication module 13 to enter the communication mode according to the second sensing signal.

Figure 4:
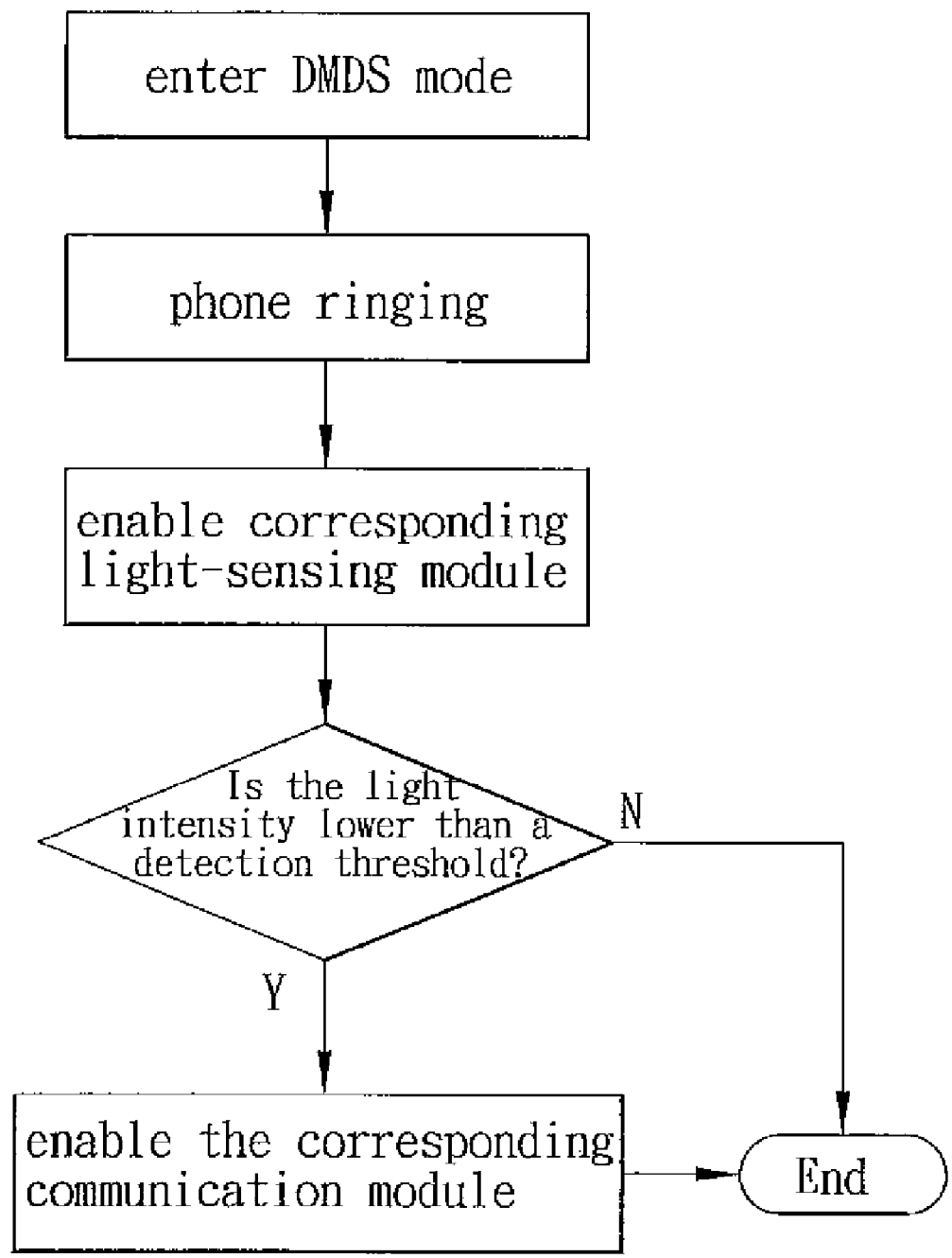
FIG. 4 is a flow chart showing operations between various elements in the method for enabling communication by sensing of the DMDS portable communication apparatus according to the preferred embodiment of the invention.

The above-mentioned two manners can be performed according to the actual requirement. In order to make the technological feature of the invention clearer, the second manner will be described in the following without any limitative purpose. The operation flow will be described with reference to FIG. 4.

First, the user makes a default choice to enter the DMDS mode so that the DMDS portable communication apparatus 1 can simultaneously receive the calls through the first communication module 12 and the second communication module 13. When the external call comes, both the first audio playing unit 123 and the second audio playing unit 133 ring. Of course, only the first audio playing unit 123 or the second audio playing unit 133 may be designed to ring. When the apparatus is ringing, the processing module 11 judges which communication unit receives the call through a transmission interface, such as a universal asynchronous receiver/transmitter (UART), between the processing module 11 and the first communication unit 121 and the second communication unit 131.

When the first communication unit 121 receives the call, the processing module 11 correspondingly enables the first light-sensing module 14 to sense through a selection signal. If the user puts his/her ear near the first audio playing unit 123, the first light-sensing module 14 senses the lower light intensity relative to that sensed in the normal condition. If the light intensity is lower than a detection threshold, an interrupting signal (i.e., the first sensing signal) is generated and transmitted to the processing module 11. The processing module 11 enables the first communication unit 121, the first audio receiving unit 122 and the first audio playing unit 123 to enter the communication mode according to the first sensing signal so that the user may talk with the other user. Herein, the interrupting signal is the first sensing signal, for example. The first sensing signal may also be a data signal, which is transmitted from the first light-sensing module 14 to the processing module 11.

As mentioned hereinabove, if the user starts to put his/her ear near the second audio playing unit 133, the light intensity sensed by the first light-sensing module 14 is not lower than the detection threshold, so the first sensing signal is not transmitted to the processing module 11 and the first communication module 12 is also not connected. At this time, the user only has to reverse the DMDS portable communication apparatus 1 so that the ear is close to the first audio playing unit 123 and the communication can be made accordingly.

If both the first communication unit 121 and the second communication unit 131 receive the calls, both the first light-sensing module 14 and the second light-sensing module 15 perform the sensing operations. However, the user only puts his/her ear near the first audio playing unit 123 or the second audio playing unit 133, so only the first light-sensing module 14 or the second light-sensing module 15 generates the interrupting signal. If the first light-sensing module 14 generates the interrupting signal (i.e., the first sensing signal), the processing module 11 is connected to the first communication module 12 according to the first sensing signal. At this time, the second communication module 13 may be in a standby mode, in which the communication is disabled, or in a holding mode, in which the communication is enabled.

When the user wants to answer the other call, he or she only has to reverse the DMDS portable communication apparatus 1 and put his or her ear near the second audio playing unit 133 to make the second light-sensing module 15 generate the interrupting signal (i.e., the second sensing signal) so that the processing module 11 can be connected to the second communication module 13 according to the second sensing signal and the user can answer the other call. At this time, the first communication module 12 may enter the holding mode.

In summary, the DMDS portable communication apparatus and the method for enabling communication by sensing thereof according to tie invention have the following features. Two light-sensing modules are provided to sense and then transmit the sensing signals to the processing module. The processing module correspondingly enables the first communication module or the second communication module to enter the communication mode according to the sensing signals so that the user can answer the call. Compared with the prior art, the invention can selectively answer the calls and switch between the calls without any button, and the efficiency in use may be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for enabling communication of a dual-mode dual-standby (DMDS) portable communication apparatus, the DMDS portable communication apparatus comprising a processing module, a first light-sensing module, a second light-sensing module, a first communication module and a second communication module, the first light-sensing module, the second light-sensing module, the first communication module and the second communication module being electrically connected with the processing module, the method comprising steps of:

sensing by the first light-sensing module so as to transmit a first sensing signal to the processing module; and sensing by the second light-sensing module so as to transmit a second sensing signal to the processing module;

wherein a communication mode of the first communication module or the second communication module is enabled according to the first sensing signal and/or the second sensing signal.

2. The method according to claim 1, further comprising a step of:

enabling the second communication module to enter a holding mode by the processing module when the first communication module enters the communication mode.

3. The method according to claim 1, further comprising a step of:

enabling the first communication module to enter a holding mode by the processing module when the second communication module enters the communication mode.

4. The method according to claim 1, wherein the first communication module and the second communication module pertain to different communication systems, each of which is selected from the group consisting of Global System for Mobile Communication (GSM), Personal Handy-phone System (PHS), Code Division Multiple Access (CDMA), Time Division Synchronized Code Division Multiple Access (TD-SCDMA), Wide-Band Code Division Multiple Access (WCDMA) and CDMA 2000.

5. A dual-mode dual-standby (DMDS) portable communication apparatus, comprising:

a processing module;

a first communication module electrically connected with the processing module;

a second communication module electrically connected with the processing module;

a first light-sensing module electrically connected with the processing module for sensing and then transmitting a first sensing signal to the processing module; and a second light-sensing module electrically connected with the processing module for sensing and then transmitting a second sensing signal to the processing module, wherein a communication mode of the first communication module or the second communication module is enabled according to the first sensing signal or the second sensing signal.

6. The DMDS portable communication apparatus according to claim 5, wherein the first communication module has a first communication unit, a first audio receiving unit and a first audio playing unit, and the first audio receiving unit and the first audio playing unit are electrically connected with the first communication unit.

7. The DMDS portable communication apparatus according to claim 6, wherein the second communication module has a second communication unit, a second audio receiving unit and a second audio playing unit, and the second audio receiving unit and the second audio playing unit are electrically connected with the second communication unit.

8. The DMDS portable communication apparatus according to claim 7, wherein the first light-sensing module is disposed adjacent to the first audio playing unit and the second light-sensing module is disposed adjacent to the second audio playing unit.

9. The DMDS portable communication apparatus according to claim 7, wherein the first audio receiving unit is disposed adjacent to the second audio playing unit and the second audio receiving unit is disposed adjacent to the first audio playing unit.

10. The DMDS portable communication apparatus according to claim 5, wherein the first communication module and the second communication module pertain to different communication systems or have different frequency bands.

11. The DMDS portable communication apparatus according to claim 5, wherein the first communication module and the second communication module pertain to different communication systems, each of which is selected from the group consisting of Global System for Mobile Communication (GSM), Personal Handy-phone System (PHS), Code Division Multiple Access (CDMA), Time Division Synchronized Code Division Multiple Access (TD-SCDMA), Wide-Band Code Division Multiple Access (WCDMA) and CDMA 2000.

12. The method according to claim 1, wherein when the first communication module and/or the second communication module receive/receives a call, the first light-sensing module and the second light-sensing module sense and respectively transmit the first sensing signal and the second sensing signal to the processing module.

13. The method according to claim 1, wherein
when one of the first communication module or the second communication module receives a call, only one of the first light-sensing module and the second light-sensing module senses and then transmits the first sensing signal or the second sensing signal to the processing module.

14. The DMDS portable communication apparatus according to claim 5, wherein when the first communication module and/or the second communication module receive/receives a call, the first light-sensing module and the second light-sensing module sense and respectively transmit the first sensing signal and the second sensing signal to the processing module.

15. The DMDS portable communication apparatus according to claim 5, wherein
when one of the first communication module or the second communication module receives a call, only one of the first light-sensing module and the second light-sensing module senses and then transmits the first sensing signal or the second sensing signal to the processing module.

16. A dual-mode dual-standby (DMDS) portable communication apparatus, comprising:
a processing module;
a first communication module electrically connected with the processing module;
a second communication module electrically connected with the processing module;
a first light-sensing module electrically connected with the processing module for sensing and then transmitting a first sensing signal to the processing module; and
a second light-sensing module electrically connected with the processing module for sensing and then transmitting a second sensing signal to the processing module, wherein a communication mode of the first communication module or the second communication module is enabled according to the first sensing signal or the second sensing signal,
wherein the first communication module has a first communication unit, a first audio receiving unit and a first audio playing unit, and the first audio receiving unit and the first audio playing unit are electrically connected with the first communication unit, and
wherein the second communication module has a second communication unit, a second audio receiving unit and a second audio playing unit, and the second audio receiving unit and the second audio playing unit are electrically connected with the second communication unit.

17. The DMDS portable communication apparatus according to claim 16, wherein the first light-sensing module is disposed adjacent to the first audio playing unit and the second light-sensing module is disposed adjacent to the second audio playing unit.

18. The DMDS portable communication apparatus according to claim 16, wherein the first audio receiving unit is disposed adjacent to the second audio playing unit and the second audio receiving unit is disposed adjacent to the first audio playing unit.

19. The DMDS portable communication apparatus according to claim 16, wherein the first communication module and the second communication module pertain to different communication systems or have different frequency bands.

20. The DMDS portable communication apparatus according to claim 16, wherein the first communication module and the second communication module pertain to different communication systems, each of which is selected from the group consisting of Global System for Mobile Communication (GSM), Personal Handy-phone System (PHS), Code Division Multiple Access (CDMA), Time Division Synchronized Code Division Multiple Access (TD-SCDMA), Wide-Band Code Division Multiple Access (WCDMA) and CDMA 2000.

* * * * *